(12) United States Patent
Liu

(10) Patent No.: US 10,261,548 B2
(45) Date of Patent: Apr. 16, 2019

(54) HINGE MODULE AND ASSEMBLING METHOD

(71) Applicant: Wistron Corporation, New Taipei (TW)

(72) Inventor: Yu-Ju Liu, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 15/455,119

(22) Filed: Mar. 9, 2017

(65) Prior Publication Data

US 2018/0120905 A1   May 3, 2018

(30) Foreign Application Priority Data

Nov. 3, 2016   (TW) .............................. 105135770 A

(51) Int. Cl.
*E05D 11/00*   (2006.01)
*E05D 3/04*   (2006.01)
(Continued)

(52) U.S. Cl.
CPC ............. *G06F 1/1681* (2013.01); *E05D 3/04* (2013.01); *E05D 7/00* (2013.01); *F16C 11/04* (2013.01);
(Continued)

(58) Field of Classification Search
CPC .......... E05D 3/04; E05D 11/00; E05D 11/06; H05K 7/016; F16M 11/16
(Continued)

(56) References Cited

U.S. PATENT DOCUMENTS 1,799,719 A * 4/1931 Zimmer .................... E06B 9/52
126/200
1,975,570 A * 10/1934 Edgcumbe ............. A47K 13/12
16/365
(Continued)

FOREIGN PATENT DOCUMENTS

| CN | 102819289 | 12/2012 |
|----|-----------|---------|
| TW | 201613453 | 4/2016 |
| TW | M521281 | 5/2016 |

OTHER PUBLICATIONS

"Office Action of Taiwan Counterpart Application," dated Sep. 7, 2018, pp. 1-12.

*Primary Examiner* — Emily M Morgan
(74) *Attorney, Agent, or Firm* — JCIPRNET

(57) ABSTRACT

A hinge module includes a first motion component, a second motion component, a third motion component, a sliding member, an elastic member and an axle. The first and second motion components are pivoted to the axle, the third motion component is fixed to the axle, the sliding member is slidably disposed on the axle, and the elastic member is connected between the sliding member and the axle. When the second motion component rotates from a first operation state to a second operation state, the second motion component props against the axle to drive the third motion component and the sliding member to rotate, and the sliding member resists elastic force of the elastic member and moves along the axle. At the moment that the second motion component continues rotating, the sliding member is rotated by elastic force of the elastic member to drive the third motion member to rotate.

33 Claims, 18 Drawing Sheets

(51) Int. Cl.
*G06F 1/16* (2006.01)
*E05D 7/00* (2006.01)
*F16C 11/04* (2006.01)

(52) U.S. Cl.
CPC ...... *G06F 1/1616* (2013.01); *E05Y 2900/606* (2013.01)

(58) Field of Classification Search
USPC .......................................................... 16/365
See application file for complete search history.

(56) References Cited

U.S. PATENT DOCUMENTS

| | | | | |
|---|---|---|---|---|
| 3,653,077 | A * | 4/1972 | Warnberg | A47K 13/12 16/229 |
| 6,779,234 | B1 * | 8/2004 | Lu | G06F 1/1616 16/334 |
| 7,581,290 | B2 * | 9/2009 | Chang | G06F 1/1616 16/303 |
| 9,857,022 | B2 * | 1/2018 | Liu | F16M 11/38 |
| 2009/0007384 | A1 * | 1/2009 | Lin | E05D 11/06 16/375 |
| 2009/0049649 | A1 * | 2/2009 | Lin | E05D 11/06 16/387 |
| 2012/0291573 | A1 * | 11/2012 | Lin | E05D 3/04 74/89 |
| 2013/0308262 | A1 * | 11/2013 | Chang | H05K 5/0226 361/679.09 |
| 2016/0088749 | A1 | 3/2016 | Liu et al. | |
| 2018/0045362 | A1 | 2/2018 | Liu et al. | |
| 2018/0119467 | A1 * | 5/2018 | Liu | E05D 11/0081 |

* cited by examiner

HINGE MODULE AND ASSEMBLING METHOD

CROSS-REFERENCE TO RELATED APPLICATION

This application claims the priority benefit of Taiwan application serial no. 105135770, filed on Nov. 3, 2016. The entirety of the above-mentioned patent application is hereby incorporated by reference herein and made a part of this specification.

BACKGROUND OF THE INVENTION

Field of the Invention

The disclosure relates to a hinge module and an assembling method, more specifically relates to a hinge module having a single axle and an assembling method of several components thereof.

Description of Related Art

Tablet computers (tablet PCs) have been gradually popularized in consumer market because of their advantages, such as light weight and portable. In order to allow the user to enter inputs into the tablet PC via a physical keyboard, the tablet PC can be inserted into a docking station having a keyboard module so as become similar to a notebook computer.

In general, the weight of the tablet PC is greater than the weight of the docking station, which leads to instability of the whole structure caused by position of the center of gravity. Although increasing the weight the of the docking station can solve the instability problem caused by position of the center of gravity, the tablet PC and its docking station lose an advantage of light weight. In addition, some docking stations are designed to have a supporting structure that is configured to solve the instability problem caused by position of the center of gravity. However, in general, the supporting structure of the docking station can only support the tablet PC at a specific tilt angle, so the user cannot adjust the tilt angle of the tablet PC to any angle according to requirement. Furthermore, some tablet PCs are designed to have a foot stand for supporting themselves, which is configured to solve the instability problem caused by position of the center of gravity. However, the supporting area of this foot stand in the tablet PC is generally small, the tablet PC easily causes discomfort when being placed on the thigh of the user, and the tilt angle of the tablet PC is limited because the foot stand is located at the back of the tablet PC.

SUMMARY OF THE INVENTION

The disclosure provides a hinge module capable of freely adjusting a tilt angle of an electronic device and preventing discomfort caused when a foot stand of the electronic device is placed on the thigh of the user.

The hinge module of the disclosure includes a first motion component, a second motion component, a third motion component, a linking component, and an axle. The second motion component is connected between the first motion component and the third motion component and has a pushing portion. The linking component includes a sliding member and an elastic member. The first and second motion components are pivoted to the axle, the third motion component is fixed to the axle, the sliding member is slidably disposed on the axle, and the elastic member is connected between the sliding member and the axle. When the second motion component rotates relative to the first motion component from a first operation state to a second operation state, the second motion component props against the axle by the pushing portion to drive the third motion component and the sliding member to synchronously rotate relative to the first motion component through the axle, and to drive the sliding member to resist an elastic force of the elastic member and move along the axle. At the moment that the second motion component continues rotating relative to the first motion component from the second operation state, the sliding member is rotated relative to the second motion component by the elastic force of the elastic member, so as to drive the third motion member to rotate relative to the second motion component and to drive the axle to depart from the pushing portion, and the second motion component is adapted to continuously rotate relative to the first motion component from the second operation state to a third operation state.

In one embodiment of the disclosure, when the second motion component is in the first operation state, an included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle.

In one embodiment of the disclosure, the sliding member is slidably disposed on the axle along an axial direction of the axle.

In one embodiment of the disclosure, the second motion component has a slot, an end of the slot forms the pushing portion, the axle has a column body thereon, the column body is located in the slot, when the included angle between the first motion component and the second motion component is increased from the first angle to the second angle, the pushing portion props against the column body.

In one embodiment of the disclosure, an extending angle of the slot around the axle is equal to a difference between the second angle and the first angle.

In one embodiment of the disclosure, the first motion component has a position limiting slot, the position limiting slot is aligned with the slot and at least a part of the position limiting slot overlaps with the slot, ends of the position limiting slot are adapted to stop the column body, so as to limit a relative rotation range between the axle and the first motion component.

In one embodiment of the disclosure, an extending angle of the position limiting slot around the axle is equal to a difference between the third angle and the first angle.

In one embodiment of the disclosure, the sliding member has at least one first convex portion, the first motion component has at least one second convex portion, along with relative rotation between the axle and the first motion component, the first convex portion and the second convex portion push against each other to drive the sliding member to move along the axle so as to compress the elastic member, and along with continuous relative rotation between the axle and the first motion component, the first convex portion surpasses the second convex portion to release elastic potential energy of the elastic member, so that the sliding member is returned by the elastic force of the elastic member along the axle and rotated relative to the second motion component.

In one embodiment of the disclosure, when the included angle between the first motion component and the second motion component is the first angle, the included angle between the first motion component and the third motion component is the first angle.

In one embodiment of the disclosure, when the included angle between the first motion component and the second motion component exceeds the second angle, the included angle between the first motion component and third motion component is the third angle.

In one embodiment of the disclosure, wherein the second motion component has a stop portion, when the included angle between the first motion component and the second motion component is increased to the third angle, the stop portion leans against the first motion component to stop the second motion component from continuing to rotate relative to the first motion component.

The hinge module of the disclosure includes a first motion component, a second motion component, a third motion component, a linking component, and an axle. The second motion component is connected between the first motion component and the third motion component and has a pulling portion. The linking component includes a sliding member and an elastic member. The first and second motion components are pivoted to the axle, the third motion component is fixed to the axle, the sliding member is slidably disposed on the axle, and the elastic member is connected between the sliding member and the axle. The second motion component is adapted to rotate relative to the first motion component from a third operation state to a second operation state. When the second motion component continues rotating relative to the first motion component from the second operation state toward a first operation state, the second motion component props against the axle by the pulling portion to drive the third motion component and the sliding member to synchronously rotate relative to the first motion component through the axle, and to drive the sliding member to resist an elastic force of the elastic member and move along the axle. At the moment that the second motion component continues rotating relative to the first motion component to reach the first operation state from the second operation state, the sliding member is rotated relative to the second motion component by the elastic force of the elastic member, so as to drive the third motion member to rotate relative to the second motion component.

In one embodiment of the disclosure, when the second motion component is in the first operation state, an included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle.

In one embodiment of the disclosure, the sliding member is slidably disposed on the axle along an axial direction of the axle.

In one embodiment of the disclosure, the second motion component has a slot, an end of the slot forms the pulling portion, the axle has a column body thereon, the column body is located in the slot, when the included angle between the first motion component and the second motion component is decreased from the second angle to the first angle, the pulling portion props against the column body.

In one embodiment of the disclosure, an extending angle of the slot around the axle is equal to a difference between the second angle and the first angle.

In one embodiment of the disclosure, the first motion component has a position limiting slot, the position limiting slot is aligned with the slot and at least a part of the position limiting slot overlaps with the slot, ends of the position limiting slot are adapted to stop the column body, so as to limit a relative rotation range between the axle and the first motion component.

In one embodiment of the disclosure, an extending angle of the position limiting slot around the axle is equal to a difference between the third angle and the first angle.

In one embodiment of the disclosure, the sliding member has at least one first convex portion, the first motion component has at least one second convex portion, along with relative rotation between the axle and the first motion component, the first convex portion and the second convex portion push against each other to drive the sliding member to move along the axle so as to compress the elastic member, and along with continuous relative rotation between the axle and the first motion component, the first convex portion surpasses the second convex portion to release elastic potential energy of the elastic member, so that the sliding member is returned by the elastic force of the elastic member along the axle and rotated relative to the second motion component.

In one embodiment of the disclosure, when the included angle between the first motion component and the second motion component is the first angle, the included angle between the first motion component and the third motion component is the first angle.

In one embodiment of the disclosure, when the included angle between the first motion component and the second motion component exceeds the second angle, the included angle between the first motion component and third motion component is the third angle.

In one embodiment of the disclosure, the second motion component has a stop portion, when the included angle between the first motion component and the second motion component is decreased to the first angle, the stop portion leans against the first motion component to stop the second motion component from continuing to rotate relative to the first motion component.

The hinge module of the disclosure includes a first motion component, a second motion component, a third motion component, a linking component, and an axle. The second motion component is connected between the first motion component and the third motion component and has a pushing portion and a pulling portion. The linking component includes a sliding member and an elastic member. The first and second motion components are pivoted to the axle, the third motion component is fixed to the axle, the sliding member is slidably disposed on the axle, and the elastic member is connected between the sliding member and the axle. When the second motion component rotates relative to the first motion component from a first operation state to a second operation state, the second motion component props against the axle by the pushing portion to drive the third motion component and the sliding member to synchronously rotate relative to the first motion component through the axle, and to drive the sliding member to resist an elastic force of the elastic member and move along the axle. At the moment that the second motion component continues rotating relative to the first motion component from the second operation state, the sliding member is rotated relative to the second motion component by the elastic force of the elastic member, so as to drive the third motion member to rotate relative to the second motion component and to drive the axle to depart from the pushing portion. When the second motion component continues rotating relative to the first motion component from the second operation state toward the first operation state, the second motion component props against the axle by the pulling portion to drive the third motion component and the sliding member to synchronously rotate relative to the first motion component through the axle, and to drive the sliding member to resist the elastic force of the elastic member and move along the axle. At the moment that the second motion component continues rotating relative to the first motion component to reach the first operation state from the second operation state, the sliding member is rotated relative to the second motion component by the elastic force of the elastic member, so as to drive the third motion member to rotate relative to the second motion component.

In one embodiment of the disclosure, when the second motion component is in the first operation state, an included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle.

In one embodiment of the disclosure, the sliding member is slidably disposed on the axle along an axial direction of the axle.

In one embodiment of the disclosure, the second motion component has a slot, two ends of the slot forms the pushing portion and the pulling portion respectively, the axle has a column body thereon, the column body is located in the slot, when the included angle between the first motion component and the second motion component is increased from the first angle to the second angle, the pushing portion props against the column body, and when the included angle between the first motion component and the second motion component is decreased from the second angle to the first angle, the pulling portion props against the column body.

In one embodiment of the disclosure, an extending angle of the slot around the axle is equal to a difference between the second angle and the first angle.

In one embodiment of the disclosure, the first motion component has a position limiting slot, the position limiting slot is aligned with the slot and at least a part of the position limiting slot overlaps with the slot, ends of the position limiting slot are adapted to stop the column body, so as to limit a relative rotation range between the axle and the first motion component.

In one embodiment of the disclosure, an extending angle of the position limiting slot around the axle is equal to a difference between the third angle and the first angle.

In one embodiment of the disclosure, the sliding member has at least one first convex portion, the first motion component has at least one second convex portion, along with relative rotation between the axle and the first motion component, the first convex portion and the second convex portion push against each other to drive the sliding member to move along the axle so as to compress the elastic member, and along with continuous relative rotation between the axle and the first motion component, the first convex portion surpasses the second convex portion to release elastic potential energy of the elastic member, so that the sliding member is returned by the elastic force of the elastic member along the axle and rotated relative to the second motion component.

In one embodiment of the disclosure, when the included angle between the first motion component and the second motion component is the first angle, the included angle between the first motion component and the third motion component is the first angle.

In one embodiment of the disclosure, when the included angle between the first motion component and the second motion component exceeds the second angle, the included angle between the first motion component and third motion component is the third angle.

In one embodiment of the disclosure, the second motion component has a stop portion, when the included angle between the first motion component and the second motion component is increased to the third angle, one side of the stop portion leans against the first motion component to stop the second motion component from continuing to rotate relative to the first motion component, and when the included angle between the first motion component and the second motion component is decreased to the first angle, another side of the stop portion leans against the first motion component to stop the second motion component from continuing to rotate relative to the first motion component.

An assembling method of the disclosure includes following steps. An axle is passed through a first motion component and a second motion component, wherein the first motion component has a position limiting slot, the second motion component has a slot, the position limiting slot is aligned with the slot, and at least a part of the position limiting slot overlaps with the slot. A column body is attached on the axle through the slot and the position limiting slot, so that the column body is located in the slot and the position limiting slot.

In one embodiment of the disclosure, the assembling method further includes following steps. A linking component is provided, the linking component includes a sliding member and an elastic member. The sliding member is slidably disposed on the axle, and the elastic member is connected between the sliding member and the axle.

Based on the above, with respect to the hinge module of the present embodiment, in process of increasing the included angle between the first motion component (connected to a docking station, for example) and the second motion component (connected to an electronic device, for example) from the first angle to the second angle, the second motion component props against the axle by the pushing portion to drive the third motion component (connected to the foot stand, for example) to rotate relative to the first motion component so as to flip over, and the sliding member is driven to resist the elastic force of the elastic member and move along the axle in this process. At the moment that the included angle between the first motion component and the second motion component exceeds the second angle, the sliding member is rotated relative to the second motion component by the elastic force of the elastic member in order to drive the axle and the third motion component to rotate relative to the second motion component, so that the foot stand connected to the third motion component can support the docking station and the electronic device. In this actuation process, the axle rotates relative to the second motion component and is not propped by the second motion component. Therefore, the second motion component can continuously flip over relative to the first motion component so as to increase the included angle between the first motion component and the second motion component to the third angle. Accordingly, the tilt angle of the second motion component and the electronic device connected to the same can be freely and independently adjusted between the second angle and the third angle and is not limited by the third motion component and the foot stand connected to the same.

In order to make the aforementioned and other features and advantages of the disclosure more comprehensible, embodiments accompanying figures are described in detail bellows.

DESCRIPTION OF THE EMBODIMENTS

Figure 1:
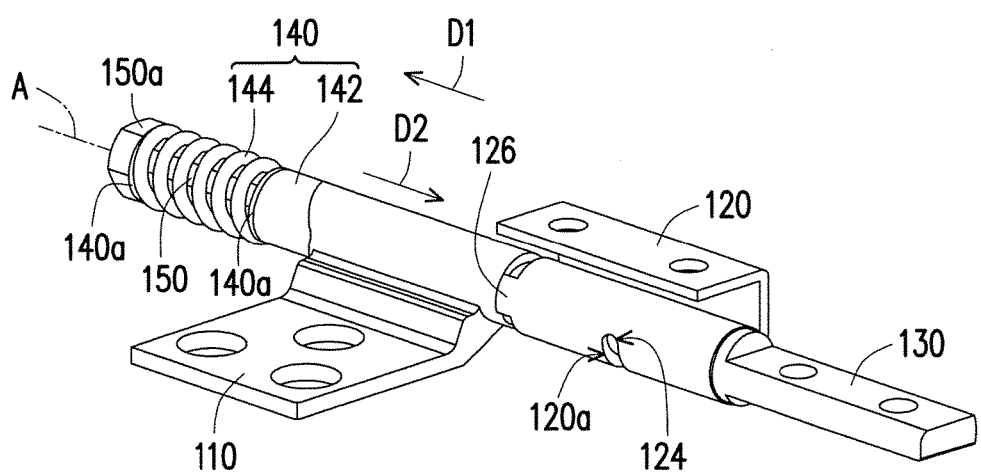
FIG. 1 is a three dimensional view of a hinge module according to an embodiment of the disclosure.
Figure 2:
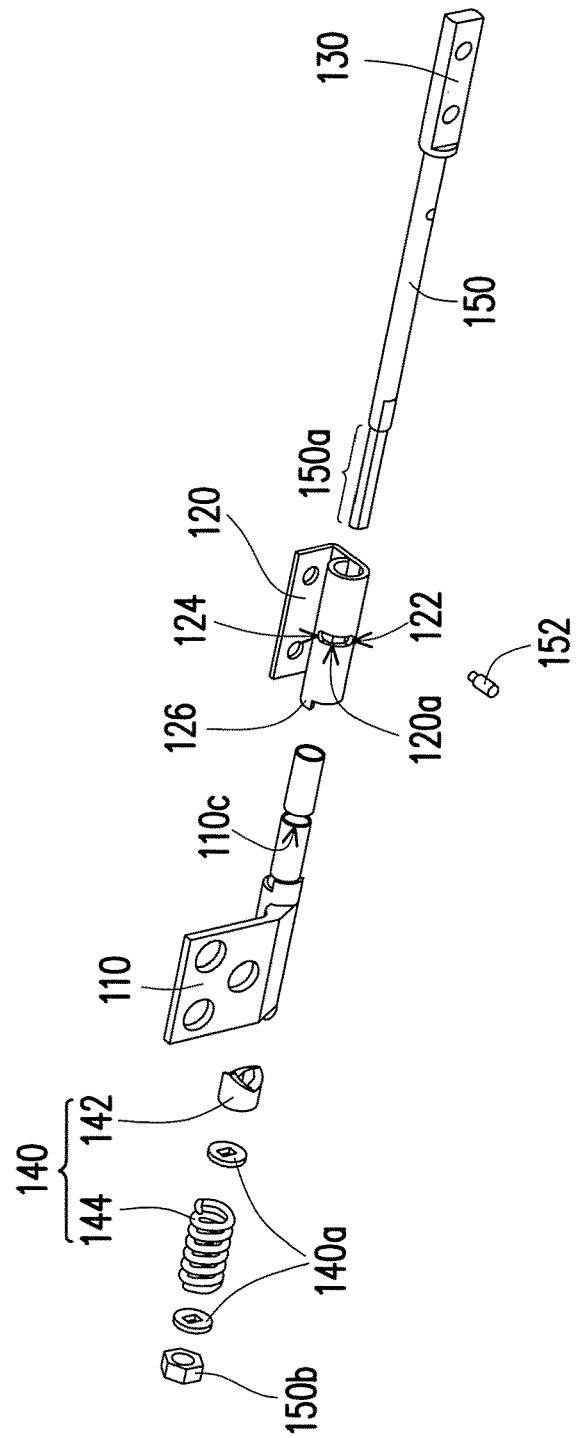
FIG. 2 is an exploded view of the hinge module in FIG. 1.
Figure 3:
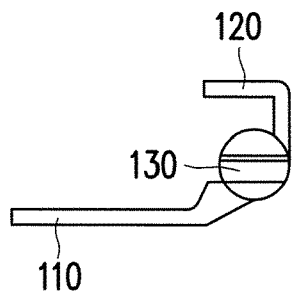
FIG. 3 is a side view of the hinge module in FIG. 1.

FIG. 1 is a three dimensional view of a hinge module according to an embodiment of the disclosure. FIG. 2 is an exploded view of the hinge module in FIG. 1. FIG. 3 is a side view of the hinge module in FIG. 1. Referring to FIGS. 1-3, the hinge module 100 of the present embodiment includes a first motion component 110, a second motion component 120, a third motion component 130, a linking component 140, and an axle 150. The second motion component 120 is connected between the first motion component 110 and the third motion component 130 and has a slot 120a, two ends of the slot 120a forms a pushing portion 122 and a pulling portion 124 respectively, the axle 150 has a column body 152 thereon, and the column body 152 is located in the slot 120a. The first motion component 110 and the second motion component 120 are pivoted to the axle 150, and the third motion component 130 is fixed to the axle 150. In the present embodiment, the first motion component 110, the second motion component 120, and the third motion component 130 all belong to a frame and are configured to respectively connect with a docking station, an electronic device, and a foot stand, for example.

The linking component 140 includes a sliding member 142 and an elastic member 144. The sliding member 142 is slidably disposed on the axle 150 along an axial direction A of the axle 150 and slides along a direction D1 or a direction D2, and the elastic member 144 is connected between the sliding member 142 and the axle 150. In the present embodiment, the sliding member 142 is slidably disposed on a non-circular section 150a of the axle 150 and the sliding member 142 cannot rotate relative to the axle 150. Moreover, in the present embodiment, a washer 140a is disposed at each of two ends of the elastic member 144, a stop component 150b (such as a screw nut) is fixed to one end of the axle 150, and the elastic member 144 and the washers 140a is sleeved on the non-circular section 150a of the axle 150 and limited between the sliding member 142 and the stop component 150b.

Figure 4:
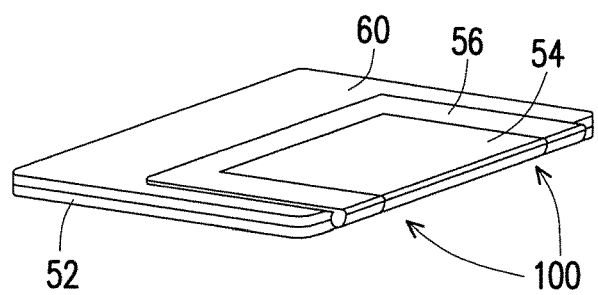
FIG. 4 is a schematic view depicting the hinge module in FIG. 1 being installed in a docking station.

FIG. 4 is a schematic view depicting the hinge module in FIG. 1 being installed in the docking station. The hinge module 100 of the present embodiment may be installed in a docking station 52 as shown in FIG. 4, wherein the first motion component 110 (shown in FIGS. 1-2) is connected to the docking station 52, the second motion component 120 (shown in FIGS. 1-2) is connected to a support plate 54, and the third motion component 130 (shown in FIGS. 1-2) is connected to a foot stand 56. The support plate 54 is configured so that an electronic device 60 (such as a tablet PC) is supported thereon. The docking station 52 has an input interface 52a (such as a keyboard depicted in FIG. 4A), and inputs are entered into the electronic device 60 via the input interface 52a. The foot stand 56 is configured to support the docking station 52 and the electronic device 60.

Figure 5A:
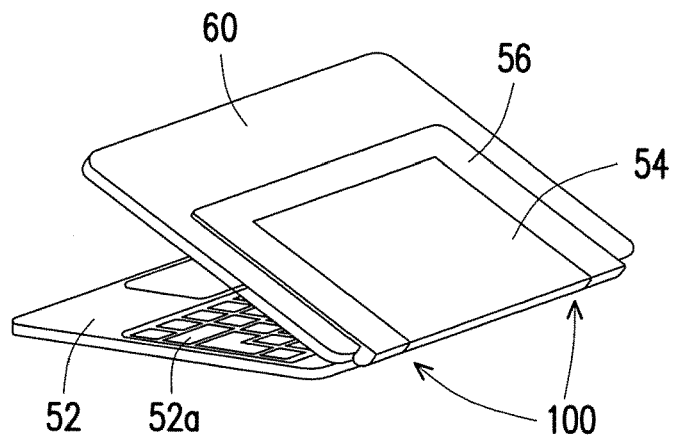
FIG. 5A to FIG. 5G are schematic views depicting actuation process of the docking station, a support plate, and a foot stand in FIG. 4.
Figure 5B:
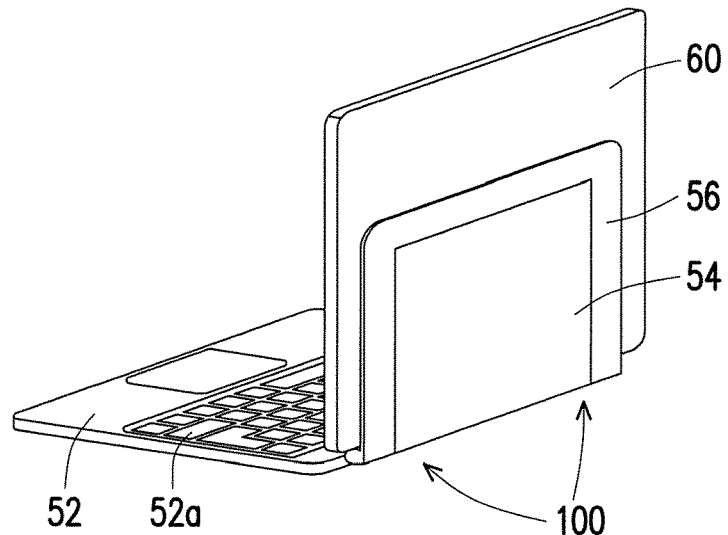
Figure 5C:
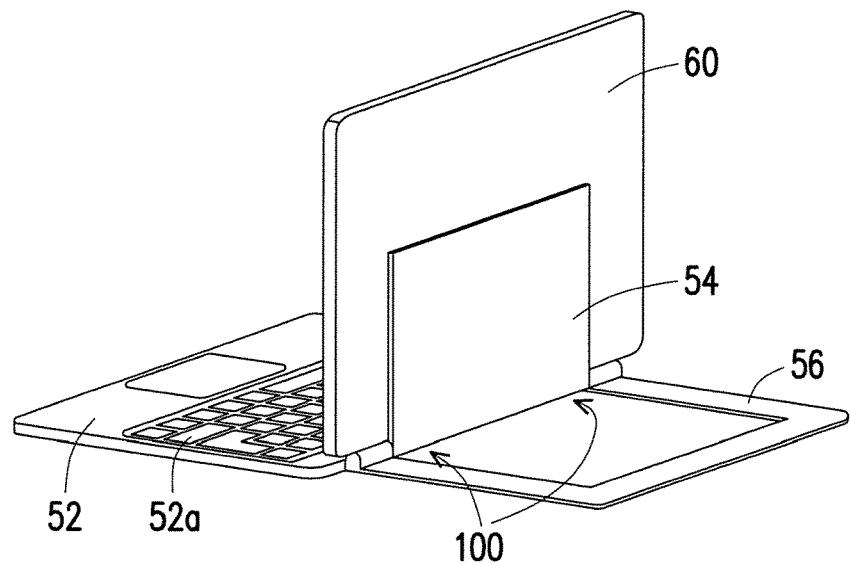
Figure 5D:
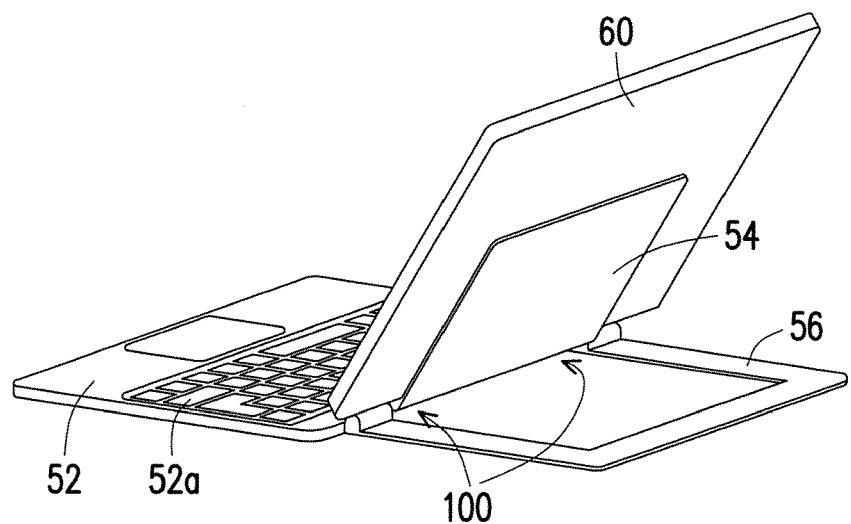
Figure 5E:
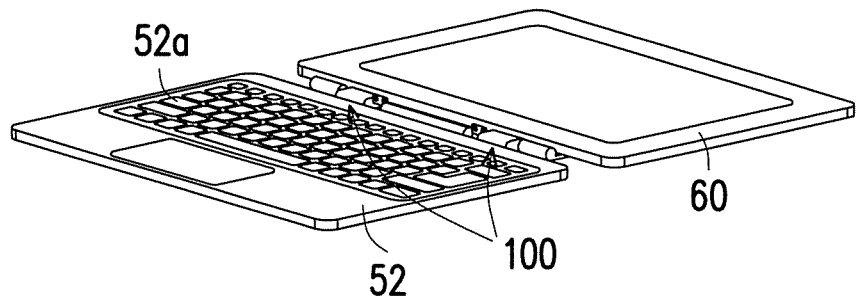
Figure 5F:
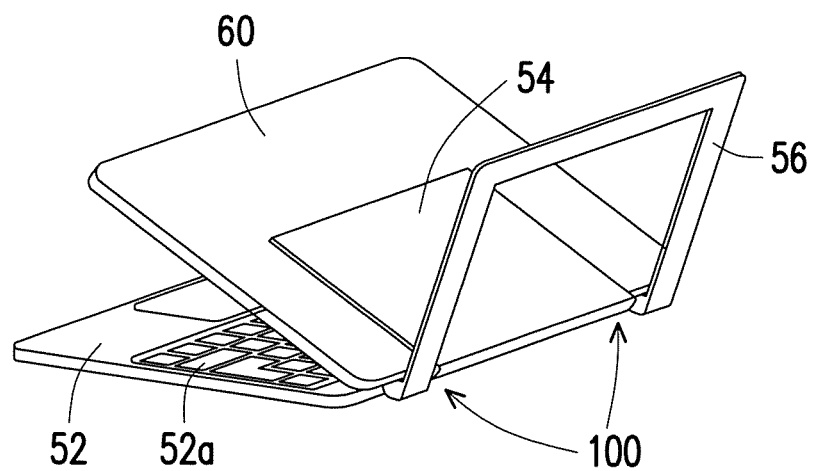
Figure 5G:
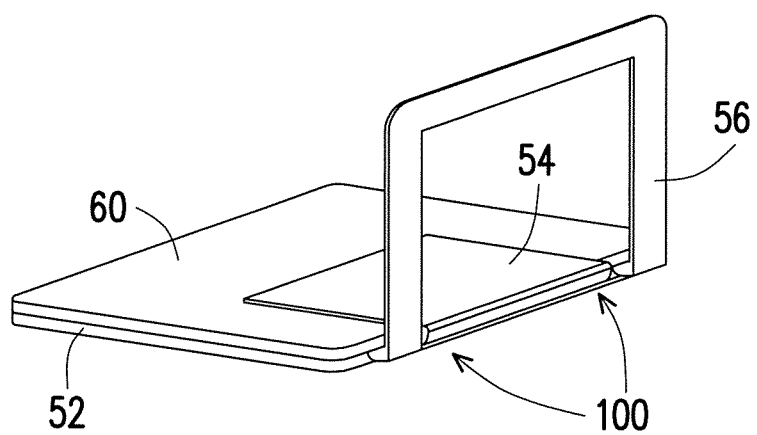
Figure 6A:
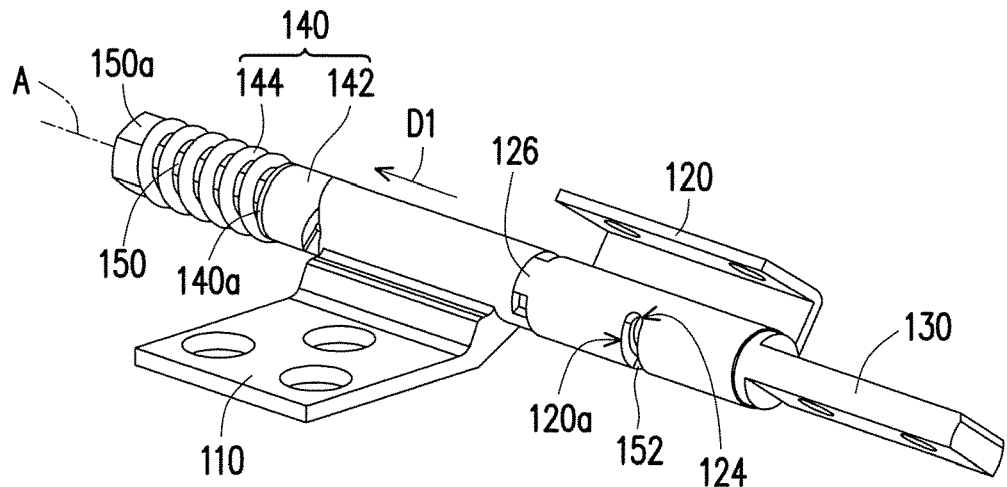
FIG. 6A to FIG. 6G are three dimensional views of the hinge module corresponding to FIG. 5A to FIG. 5G, respectively.
Figure 6B:
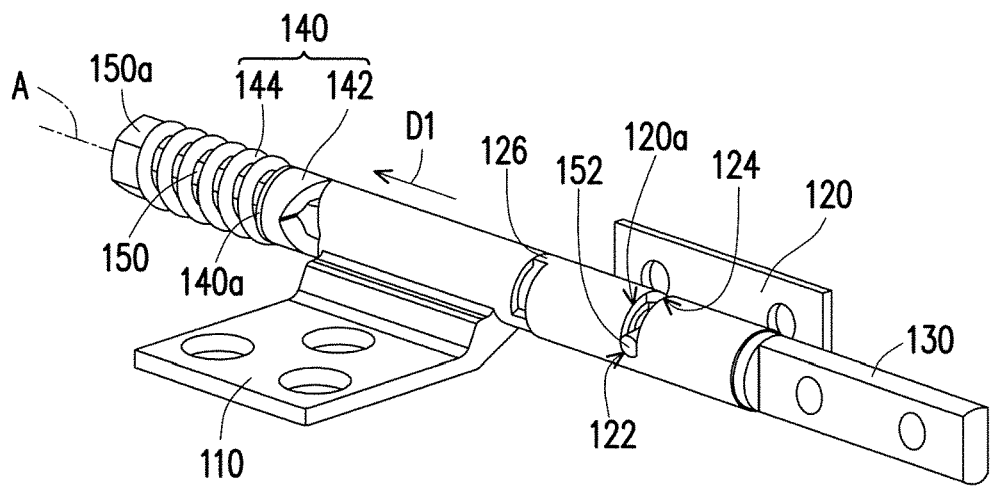
Figure 6C:
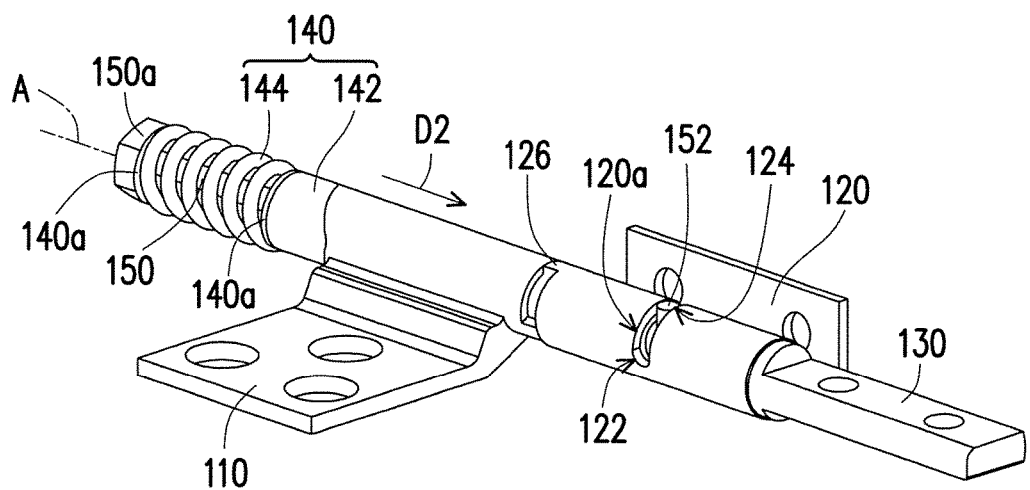
Figure 6D:
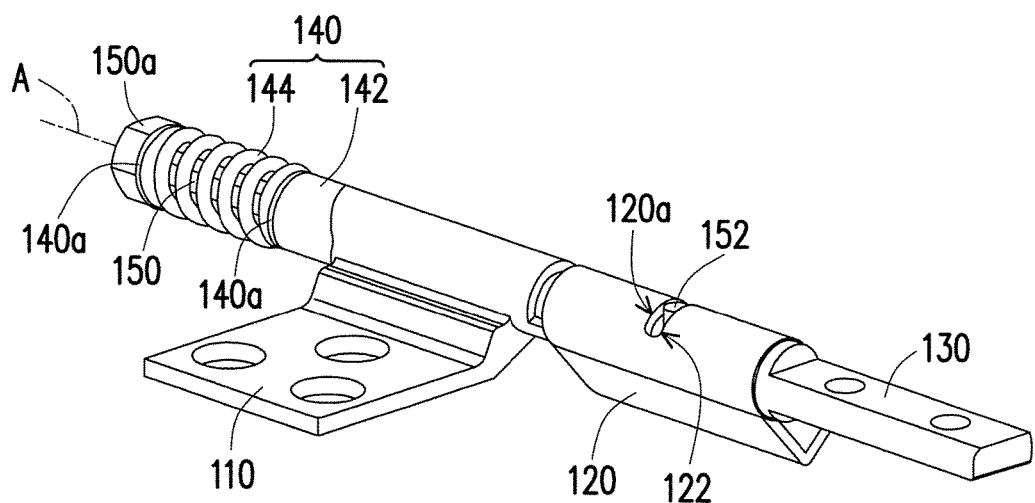
Figure 6E:
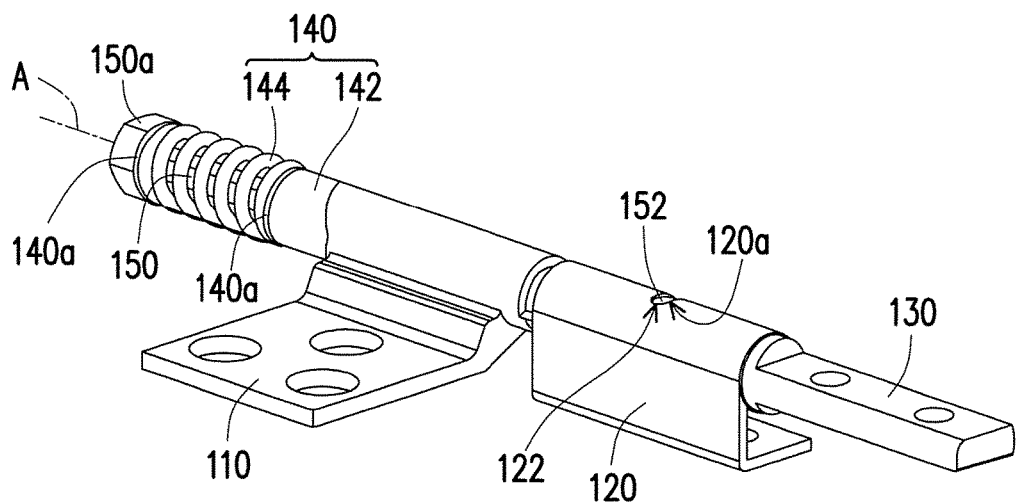

FIG. 5A to FIG. 5G are schematic views depicting actuation process of the docking station, the support plate, and the foot stand in FIG. 4. FIG. 6A to FIG. 6G are three dimensional views of the hinge module corresponding to FIG. 5A to FIG. 5G, respectively. FIG. 7A to FIG. 7G are side views of the hinge module corresponding to FIG. 6A to FIG. 6G, respectively. In a closed state shown in FIG. 1, FIG. 3, and FIG. 4, the included angle between the first motion component 110 and the second motion component 120 is a first angle (such as 0 degree) as shown in FIG. 3. At this time, the included angle between the first motion component 110 and the third motion component 130 is also the first angle (such as 0 degree). When the user applies force on the electronic device 60 disposed on the support plate 54 shown in FIG. 4 to make the second motion component 120 rotate from a first operation state shown in FIG. 5A to a second operation state shown in FIG. 5B, the second motion component 120 connected to the support plate 54 rotates relative to the first motion component 110 as shown in FIG. 6A to 6B so that the included angle between the first motion component 110 and the second motion component 120 is increased to a second angle (such as 90 degrees) as shown in FIG. 7A to FIG. 7B, and the pushing portion 122 of the second motion component 120 props against the column body 152 on the axle 150 in order to use the axle 150 to drive the third motion component 130 and the sliding member 142 to synchronously rotate relative to the first motion component 110 to reach a state shown in FIG. 6B. In this process, the first motion component 110 and the sliding member 142 push against each other to drive the sliding member 142 to resist an elastic force of the elastic member 144 and move along the axial direction A of the axle 150 (such as moving along the direction D1 shown in FIG. 6A and FIG. 6B).

Next, the second motion component 120 in FIG. 7B continues rotating relative to the first motion component 110 from the second operation state, so that the included angle between the first motion component 110 and the second motion component 120 exceeds the second angle (such as 90 degrees), and the sliding member 142 is released from the first motion component 110 and rotates relative to the first motion component 110. Accordingly, the sliding member 142 is returned along the direction D2 (indicated in FIG. 6C) by the elastic force of the elastic member 142 as shown in FIG. 6B to FIG. 6C, and because the first motion component 110 guides the sliding member 142 to make the sliding member 142 rotate relative to the second motion component 120 so as to drive the third motion component 130 to rotate relative to the second motion component 120, the included angle between the first motion component 110 and the third motion component 130 reaches a third angle (such as 180 degrees). At this time, the foot stand 56 is actuated to a state shown in FIG. 5C.

Figure 7A:
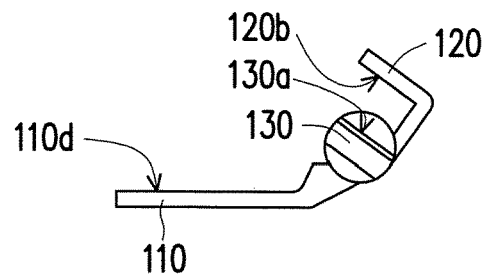
FIG. 7A to FIG. 7G are side views of the hinge module corresponding to FIG. 6A to FIG. 6G, respectively.
Figure 7B:
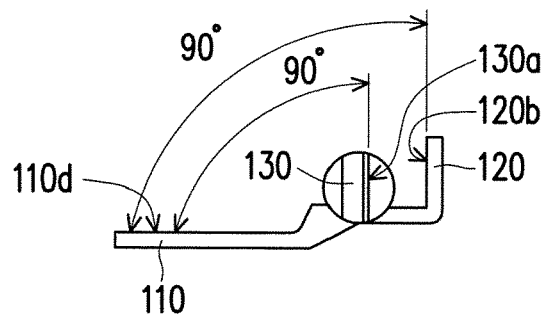
Figure 7C:
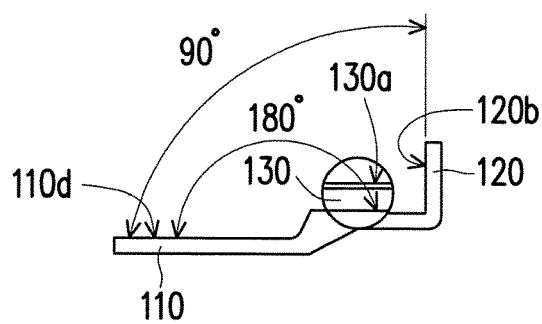
Figure 7D:
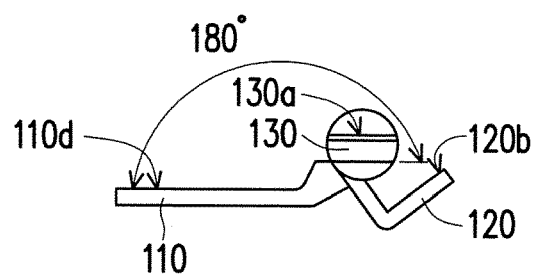
Figure 7E:
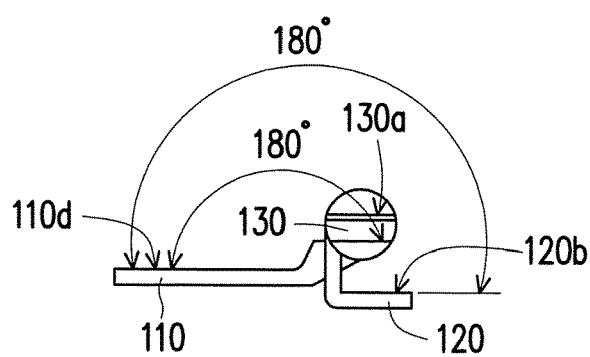

In the actuation process from FIG. 6B to FIG. 6C, the sliding member 142 drives the axle 150 to rotate relative to the second motion component 120 so as to drive the column body 152 of the axle 150 to depart from the pushing portion 122 of the second motion component 120. Therefore, the second motion component 120 stops driving the third motion component 130 to rotate relative to the first motion component 110. Under the circumstance that the second motion component 120 stops driving the third motion component 130, the second motion component 120 can continue to flip over relative to the first motion component 110. To be more specific, when the second motion component 120 in FIG. 6C continues rotating relative to the first motion component 110 from the second operation state to a third operation state as shown in FIG. 6D to FIG. 6E so as to increase the included angle between the first motion component 110 and the second motion component 120 to the third angle (such as 180 degrees) as shown in FIG. 7D to FIG. 7E, the electronic device 60 is further flipped over as shown in FIG. 5D to FIG. 5E. In this process, the included angle between the first motion component 110 and the third motion component 130 is kept at the third angle (such as 180 degrees) as shown in FIG. 7C to FIG. 7E.

By the aforementioned disposition method, the tilt angle of the second motion component 120 and the electronic device 60 connected to the same can be freely and independently adjusted between the second angle and the third angle and is not limited by the third motion component 130 and the foot stand 56 connected to the same. In addition, since the hinge module 100 has three motion components (such as the first motion component 110, the second motion component 120, and the third motion component 130) configured to respectively connect with the docking station 52, the electronic device 60, and the foot stand 56, the foot stand 56 does not need to be mounted on the electronic device 60. Hence, the size of the foot stand 56 is not limited by the design of the electronic device 60, so that the foot stand 56 may have a larger supporting area, in order to prevent discomfort caused when the foot stand 56 is placed on the thigh of the user.

The process of closing the electronic device 60 and the foot stand 56 toward the docking station 52 and the corresponding actuation process of the hinge module 100 are described as followings. When the second motion component 120 in FIG. 6 rotates relative to the first motion component 110 from the third operation state to the second operation state shown in FIG. 6C in order to decrease the included angle between the first motion component 110 and the second motion component 120 to the second angle (such as 90 degrees) shown in FIG. 7C, the second motion component 120 does not prop against the column body 152 on the axle 150. Accordingly, the third motion component 130 is not driven, so the included angle between the first motion component 110 and the third motion component 130 is kept at the third angle (such as 180 degrees). At this time, the electronic device 60 is actuated from a state in FIG. 5E to a state in FIG. 5C.

Figure 6F:
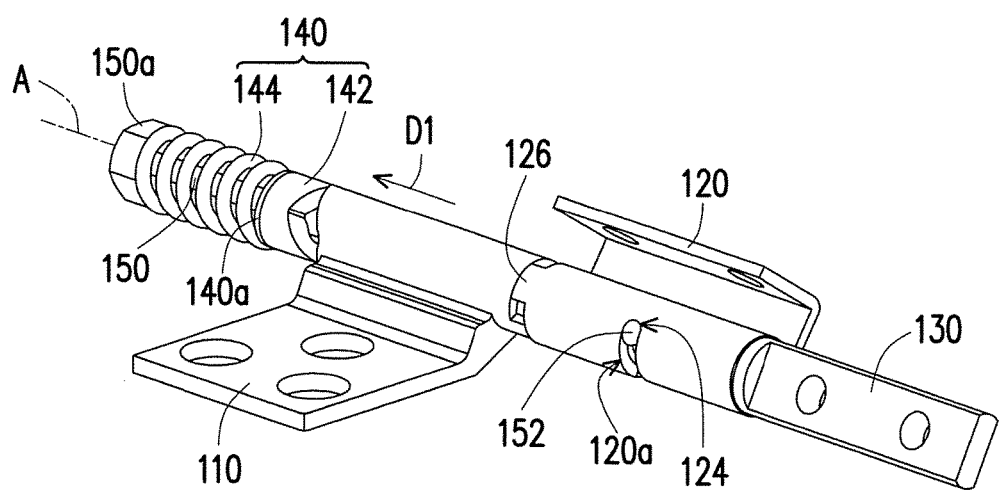
Figure 6G:
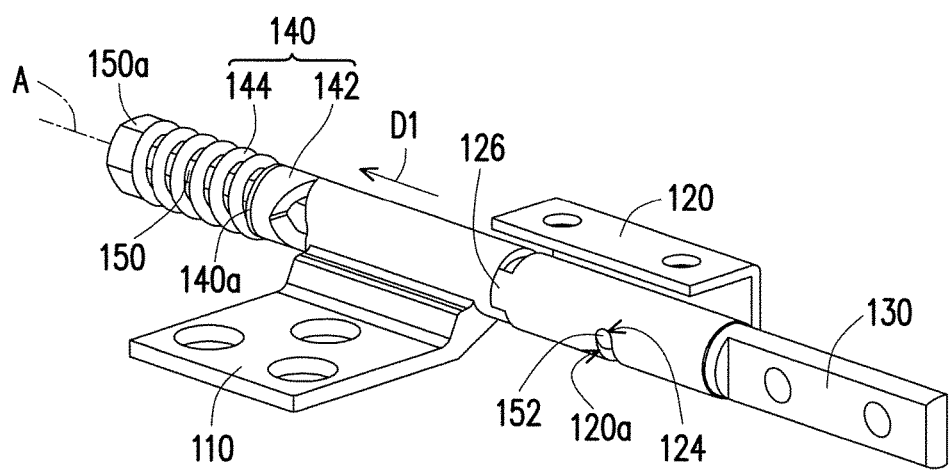
Figure 7F:
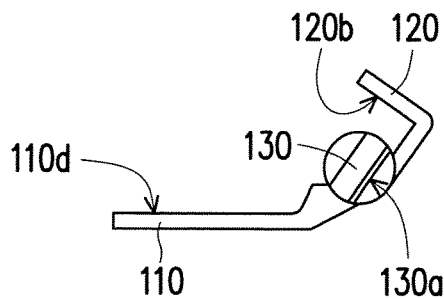
Figure 7G:
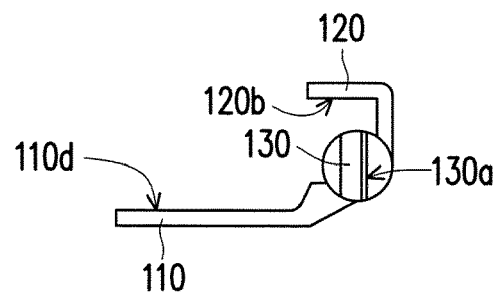

Next, when the second motion component 120 in FIG. 6C continues rotating relative to the first motion component 110 from the second operation state toward the first operation state as shown in FIG. 6F to FIG. 6G so as to decrease the included angle between the first motion component 110 and the second motion component 120 toward the first angle (such as 0 degree) as shown in FIG. 7F to FIG. 7G, the pulling portion 124 of the second motion component 120 props against the column body 152 on the axle 150, so as to use the axle 150 to drive the third motion component 130 and the sliding member 142 to synchronously rotate relative to the first motion component 110 to a state shown in FIG. 6G. In this process, the first motion component 110 and the sliding member 142 push against each other to drive the sliding member 142 to resist the elastic force of the elastic member 144 and move along the axial direction A of the axle 150 (such as moving along the direction D1 shown in FIG. 6F and FIG. 6G). At this time, the electronic device 60 and the foot stand 56 are actuated from FIG. 5F to FIG. 5G.

At the moment that the second motion component 120 continues rotating relative to the first motion component 110 from the second operation state to the first operation state so as to decrease the included angle between the first motion component 110 and the second motion component 120 to the first angle (such as 0 degrees) shown in FIG. 7G, the sliding member 142 is released from the first motion component 110 and rotates relative to the first motion component 110. Accordingly, the sliding member 142 is returned along the direction D2 (indicated in FIG. 1) by the elastic force of the elastic member 144 as shown in FIG. 6G to FIG. 1, and because the first motion component 110 guides the sliding member 142 to make the sliding member 142 rotate relative to the second motion component 120 so as to drive the third motion component 130 to rotate relative to the second motion component 120, the included angle between the first motion component 110 and the third motion component 130 reaches the first angle (such as 0 degrees) as shown in FIG. 3. At this time, the foot stand 56 is actuated to a state shown in FIG. 4.

Referring to FIG. 7A to FIG. 7G, the first motion component 110 has a reference surface 110d, the second motion component 120 has a reference surface 120b, and the third motion component 130 has a reference surface 130a. Based on above, the included angle between the first motion component 110 and the second motion component 120 is an included angle between the reference surface 110d and the reference surface 120b, and the included angle between the first motion component 110 and the third motion component 130 is an included angle between the reference surface 110d and the reference surface 130a.

Figure 8:
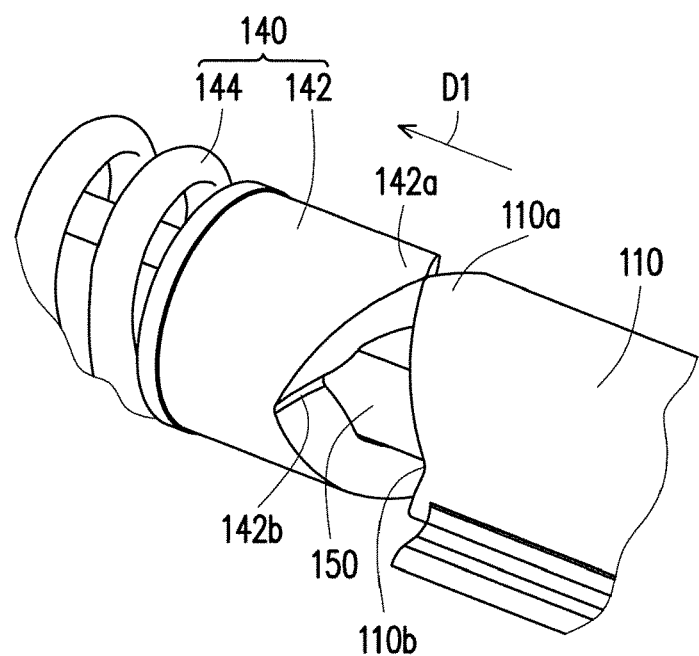
FIG. 8 is a partial three dimensional view of the hinge module in FIG. 6B.
Figure 9:
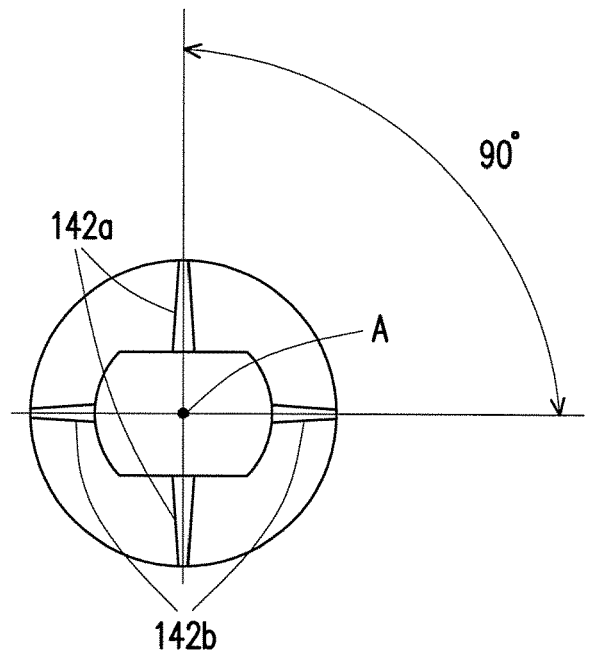
FIG. 9 is a side view of a sliding member in FIG. 8.
Figure 10:
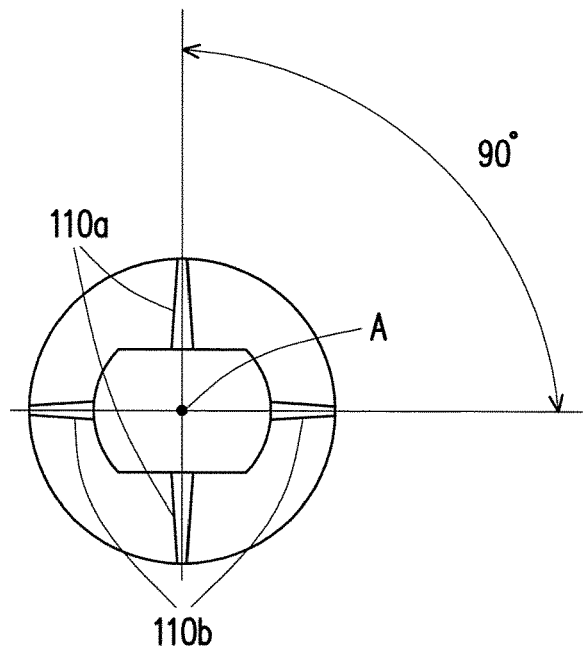
FIG. 10 is a side view of a first motion component in FIG. 8.

The method of the sliding member and the first motion component pushing against each other in the present embodiment is described in detail as followings. FIG. 8 is a partial three dimensional view of the hinge module in FIG. 6B. FIG. 9 is a side view of the sliding member in FIG. 8. FIG. 10 is a side view of the first motion component in FIG. 8. Referring to FIG. 8 to FIG. 10, in the present embodiment, the sliding member 142 has two first convex portions 142a and has two first concave portions 142b correspondingly. Similarly, the first motion component 110 has two second convex portions 110a and has two second concave portions 110b correspondingly. When the hinge module 100 is in the state shown in FIG. 1, the two first convex portions 142a of the sliding member 142 respectively fit into the two second concave portions 110b of the first motion component 110, and the two second convex portions 110a of the first motion component 110 respectively fit into the two first concave portions 142b of the sliding member 142. When the hinge module 100 is actuated from the state in FIG. 1 to the state shown in FIG. 6B, along with relative rotation between the axle 150 and the first motion component 110, the sliding member 142 is driven by the axle 150 so the first convex portion 142a and the second convex portion 110a push against each other as shown in FIG. 8, so as to drive the sliding member 142 to move in the direction D1 along the axle 150 and compress the elastic member 144. At the state shown in FIG. 6B, the first convex portion 142a and the second convex portion 110a are aligned with each other. Next, along with continuous relative rotation between the axle 150 and the first motion component 110, the first convex portion 142a surpasses the second convex portion 110a to release elastic potential energy of the elastic member 144, so that the sliding member 142 is returned by the elastic force of the elastic member 144 in the direction D2 (as indicated in FIG. 1) along the axle 150, and the sliding member 142 is guided by oblique surfaces between the second convex portion 110a and the second concave portion 110b to rotate relative to the second motion component 120.

Figure 11:
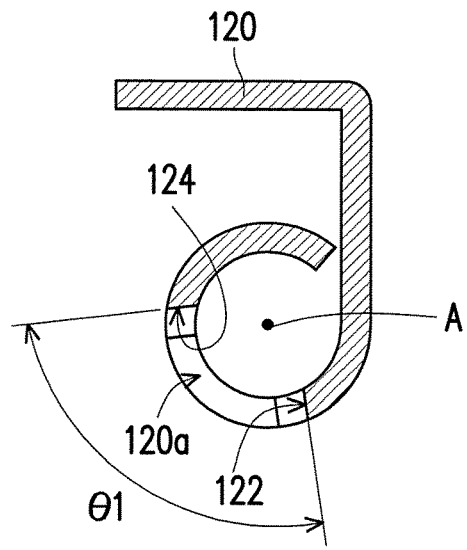
FIG. 11 is a cross sectional view of a second motion component in FIG. 1.

FIG. 11 is a cross sectional view of the second motion component in FIG. 1. Referring to FIG. 11, in the present embodiment, an extending angle θ1 of the slot 120a of the second motion component 120 around the axle 150 is equal to or slightly smaller than a difference between the second angle (such as 90 degrees) and the first angle (such as 0 degree), for example. In addition, an angle difference of the first convex portion 142a and the first concave portion 142b around the axial direction A is 90 degrees as shown in FIG. 9 and is equal to the difference between the second angle (such as 90 degrees) and the first angle (such as 0 degree), and an angle difference of the second convex portion 110a and the second concave portion 110b around the axial direction A is 90 degrees as shown in FIG. 10 and is equal to the difference between the second angle (such as 90 degrees) and the first angle (such as 0 degree). Hence, the hinge module 100 can smoothly actuate from the state in FIG. 1 and FIG. 6A to the state in FIG. 6G.

Figure 12:
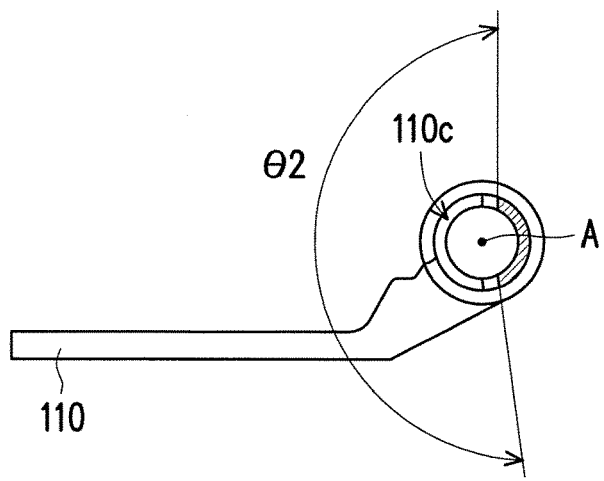
FIG. 12 is a cross sectional view of the first motion component in FIG. 1.

FIG. 12 is a cross sectional view of the first motion component in FIG. 1. Referring to FIG. 2 and FIG. 12, in the present embodiment, the first motion component 110 has a position limiting slot 110c, the position limiting slot 110c is aligned with the slot 120a of the second motion component 120, and at least a part of the position limiting slot 110c overlaps with the slot 120a of the second motion component 120. The ends of the position limiting slot 110c are adapted to stop the column body 152, so as to limit a relative rotation range between the axle 150 and the first motion component 110. To be more specific, the two ends of the position limiting slot 110c respectively stop the column body 152 on the axle 150 in the states shown in FIG. 4 and FIG. 5C, so the included angle between the third motion component 130 and the first motion component 110 is limited from the first angle (such as 0 degree) to the third angle (such as 180 degrees). In order to achieve the aforementioned effect, an extending angle θ2 of the position limiting slot 110c around the axle 150 is equal to or slightly greater than a difference between the third angle (such as 180 degrees) and the first angle (such as 0 degree).

Figure 13:
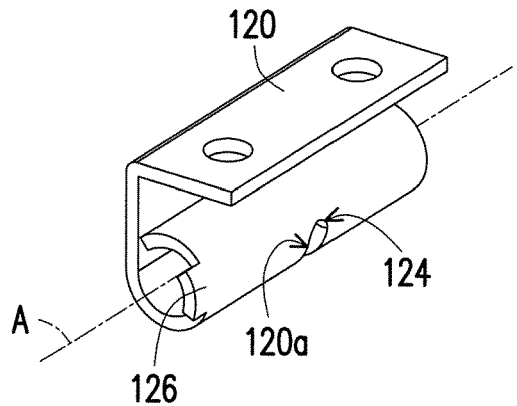
FIG. 13 is a three dimensional view of the second motion component in FIG. 1.

FIG. 13 is a three dimensional view of the second motion component in FIG. 1. Referring to FIG. 1 and FIG. 13, in the present embodiment, the second motion component 120 has a stop portion 126 configured to limit the rotation of the second motion component 120. Specifically, when the included angle between the first motion component 110 and the second motion component 120 is increased to the third angle (such as 180 degrees) as shown in FIG. 7E, one side of the stop portion 126 leans against the first motion component 110 to stop the second motion component 120 from continuing to rotate relative to the first motion component 110. Moreover, when the included angle between the first motion component 110 and the second motion component 120 is decreased to the first angle (such as 0 degrees) as shown in FIG. 3, another side of the stop portion 126 leans against the first motion component 110 to stop the second motion component 120 from continuing to rotate relative to the first motion component 110. Namely, since the stop portion 126 of the second motion component 120 and the first motion component 110 stop each other, the maximum angle that the second motion component 120 can flip over in the present embodiment is limited to 180 degrees. However, the disclosure is not limited thereto, some examples accompanying with drawings are described as followings.

Figure 14:
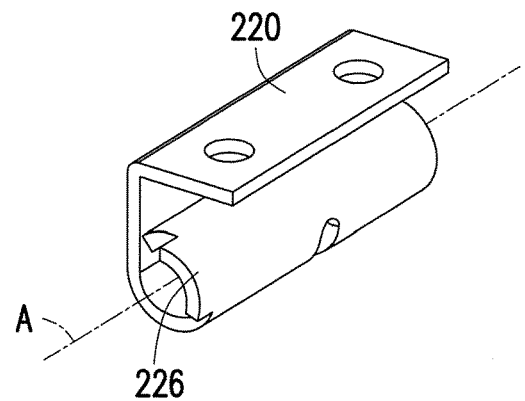
FIG. 14 is a three dimensional view of a second motion component in another embodiment of the disclosure.

FIG. 14 is a three dimensional view of a second motion component in another embodiment of the disclosure. The configuration and actuation of a second motion component 220 in FIG. 14 are similar to that of the second motion component 120 in FIG. 13 and will not be repeated. The differences between the second motion component 220 and the second motion component 120 are that an extending length of the stop portion 226 of the second motion component 220 around the axial direction A is greater, and the maximum angle that the second motion component 220 can flip over becomes a smaller angle (such as 135 degrees).

Figure 15:
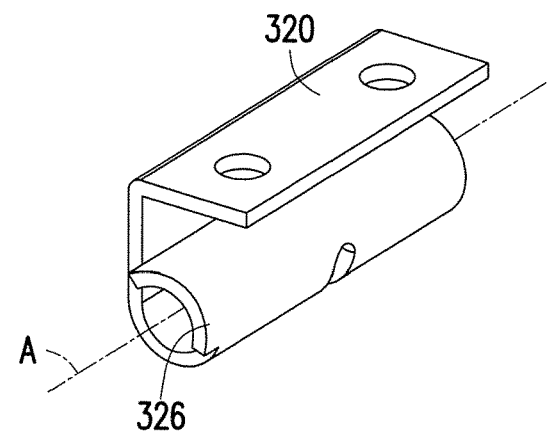
FIG. 15 is a three dimensional view of a second motion component in yet another embodiment of the disclosure.

FIG. 15 is a three dimensional view of a second motion component in yet another embodiment of the disclosure. The configuration and actuation of a second motion component 320 in FIG. 15 are similar to that of the second motion component 220 in FIG. 14 and will not be repeated. The differences between the second motion component 320 and the second motion component 220 are that an extending length of the stop portion 326 of the second motion component 320 around the axial direction A is even greater, and the maximum angle that the second motion component 320 can flip over becomes even a smaller angle (such as 90 degrees).

Figure 16:
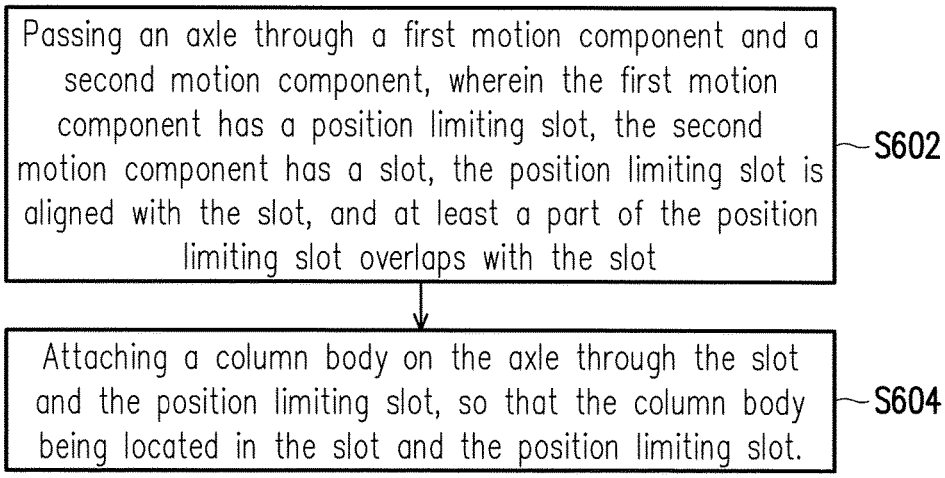
FIG. 16 is a flow chart of an assembling method of an axle, the first motion component, the second motion component, and a column body in FIG. 2.

The assembling method of some components of the hinge module 100 in the aforementioned embodiment is described as followings. FIG. 16 is a flow chart of an assembling method of the axle, the first motion component, the second motion component, and the column body in FIG. 2. Firstly, the axle 150 shown in FIG. 2 is passed through a first motion component 110 and a second motion component 120, wherein the first motion component 110 has a position limiting slot 110c, the second motion component 120 has a slot 120a, the position limiting slot 110c is aligned with the slot 120a, and at least a part of the position limiting slot 110c overlaps with the slot 120a (step S602). Next, a column body 152 shown in FIG. 2 is attached on the axle 150 through the slot 120a and the position limiting slot 110c, so that the column body 152 is located in the slot 120a and the position limiting slot 110c (step S604). Moreover, a linking component 140 is provided, the linking component 140 includes a sliding member 142 and an elastic member 144. The sliding member 142 is slidably disposed on the axle 150, and the elastic member 144 is connected between the sliding member 142 and the axle 150.

In summary, with respect to the hinge module of the present embodiment, in process of increasing the included angle between the first motion component (connected to a docking station, for example) and the second motion component (connected to an electronic device, for example) from the first angle to the second angle, the second motion component props against the axle by the pushing portion to drive the third motion component (connected to the foot stand, for example) to rotate relative to the first motion component so as to flip over, and the sliding member is driven to resist the elastic force of the elastic member and move along the axle in this process. At the moment that the included angle between the first motion component and the second motion component exceeds the second angle, the sliding member is rotated relative to the second motion component by the elastic force of the elastic member in order to drive the axle and the third motion component to rotate relative to the second motion component, so that the foot stand connected to the third motion component can support the docking station and the electronic device. In this actuation process, the axle rotates relative to the second motion component and is not propped by the second motion component. Therefore, the second motion component can continuously flip over relative to the first motion component so as to increase the included angle between the first motion component and the second motion component to the third angle. Accordingly, the tilt angle of the second motion component and the electronic device connected to the same can be freely and independently adjusted between the second angle and the third angle and is not limited by the third motion component and the foot stand connected to the same. In addition, since the hinge module has three motion components (such as the first motion component, the second motion component, and the third motion component) configured to respectively connect with the docking station, the electronic device, and the foot stand, the foot stand does not need to be mounted on the electronic device. Hence, the size of the foot stand is not limited by the design of the electronic device, so that the foot stand may have a larger supporting area, in order to prevent discomfort caused when the foot stand is placed on the thigh of the user.

Although the disclosure has been disclosed with reference to the aforesaid embodiments, they are not intended to limit the disclosure. It will be apparent to one of ordinary skill in the art that modifications and variations to the described embodiments may be made without departing from the spirit and the scope of the disclosure. Accordingly, the scope of the disclosure will be defined by the attached claims and not by the above detailed descriptions.

What is claimed is:

1. A hinge module, comprising:
a first motion component, a second motion component, and a third motion component, the second motion component being connected between the first motion component and the third motion component, wherein the second motion component has a slot, an end of the slot forms a pushing portion;
a linking component, comprising a sliding member and an elastic member; and
an axle, the first and second motion components being pivoted to the axle, the third motion component being fixed to the axle, the sliding member being slidably disposed on the axle, the elastic member being connected between the sliding member and the axle, and the axle has a column body thereon, the column body is located in the slot;
wherein when the second motion component rotates relative to the first motion component from a first operation state to a second operation state, the axle is rotated by the pushing portion of the second motion component pushing the column body of the axle and the third motion component and the sliding member are synchronously rotated relative to the first motion component by the axle, and the sliding member pushes against the first motion component to resist an elastic force of the elastic member and move along the axle,
at the moment that the second motion component continues rotating relative to the first motion component from the second operation state, the sliding member is rotated relative to the second motion component by the elastic force of the elastic member, the axle is rotated by the sliding member, the column body of the axle departs from the pushing portion, the third motion member is rotated relative to the second motion component by the axle, and the second motion component continues to rotate relative to the first motion component from the second operation state to a third operation state.

2. The hinge module as recited in claim 1, wherein when the second motion component is in the first operation state, an included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle, the first angle is smaller than the second angle, and the second angle is smaller than the third angle.

3. The hinge module as recited in claim 1, wherein the sliding member is slidably disposed on the axle along an axial direction of the axle.

4. The hinge module as recited in claim 2, wherein when the included angle between the first motion component and the second motion component is increased from the first angle to the second angle, the pushing portion props against the column body.

5. The hinge module as recited in claim 4, wherein an extending angle of the slot around the axle is equal to a difference between the second angle and the first angle.

6. The hinge module as recited in claim 4, wherein the first motion component has a position limiting slot, the position limiting slot is aligned with the slot and at least a part of the position limiting slot overlaps with the slot, ends of the position limiting slot are adapted to stop the column body, so as to limit a relative rotation range between the axle and the first motion component.

7. The hinge module as recited in claim 6, wherein an extending angle of the position limiting slot around the axle is equal to a difference between the third angle and the first angle.

8. The hinge module as recited in claim 1, wherein the sliding member has at least one first convex portion, the first motion component has at least one second convex portion, along with relative rotation between the axle and the first motion component, the first convex portion and the second convex portion push against each other to drive the sliding member to move along the axle so as to compress the elastic member, and along with continuous relative rotation between the axle and the first motion component, the first convex portion surpasses the second convex portion to release elastic potential energy of the elastic member, so that the sliding member is returned by the elastic force of the elastic member along the axle and rotated relative to the second motion component.

9. The hinge module as recited in claim 2, wherein when the included angle between the first motion component and the second motion component is the first angle, the included angle between the first motion component and the third motion component is the first angle.

10. The hinge module as recited in claim 2, wherein when the included angle between the first motion component and the second motion component exceeds the second angle, the included angle between the first motion component and third motion component is the third angle.

11. The hinge module as recited in claim 2, wherein the second motion component has a stop portion, when the included angle between the first motion component and the second motion component is increased to the third angle, the stop portion leans against the first motion component to stop the second motion component from continuing to rotate relative to the first motion component.

12. A hinge module, comprising:
a first motion component, a second motion component, and a third motion component, the second motion component being connected between the first motion component and the third motion component, wherein the second motion component has a slot, an end of the slot forms a pulling portion;
a linking component, comprising a sliding member and an elastic member; and
an axle, the first and second motion components being pivoted to the axle, the third motion component being fixed to the axle, the sliding member being slidably disposed on the axle, the elastic member being connected between the sliding member and the axle, and the axle has a column body thereon, the column body is located in the slot;
wherein the second motion component rotates relative to the first motion component from a third operation state to a second operation state,
when the second motion component continues rotating relative to the first motion component from the second operation state toward a first operation state, the axle is rotated by the pulling portion of the second motion component pulling the column body of the axle and the third motion component and the sliding member are synchronously rotated relative to the first motion component by the axle, and the sliding member pushes against the first motion component to resist an elastic force of the elastic member and move along the axle,
at the moment that the second motion component continues rotating relative to the first motion component to reach the first operation state from the second operation state, the sliding member is rotated relative to the second motion component by the elastic force of the elastic member, the axle is rotated by the sliding member, and the third motion member is rotated relative to the second motion component by the axle.

13. The hinge module as recited in claim 12, wherein when the second motion component is in the first operation state, an included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle, the first angle is smaller than the second angle, and the second angle is smaller than the third angle.

14. The hinge module as recited in claim 12, wherein the sliding member is slidably disposed on the axle along an axial direction of the axle.

15. The hinge module as recited in claim 13, wherein when the included angle between the first motion component and the second motion component is decreased from the second angle to the first angle, the pulling portion props against the column body.

16. The hinge module as recited in claim 15, wherein an extending angle of the slot around the axle is equal to a difference between the second angle and the first angle.

17. The hinge module as recited in claim 15, wherein the first motion component has a position limiting slot, the position limiting slot is aligned with the slot and at least a part of the position limiting slot overlaps with the slot, ends of the position limiting slot are adapted to stop the column body, so as to limit a relative rotation range between the axle and the first motion component.

18. The hinge module as recited in claim 17, wherein an extending angle of the position limiting slot around the axle is equal to a difference between the third angle and the first angle.

19. The hinge module as recited in claim 12, wherein the sliding member has at least one first convex portion, the first motion component has at least one second convex portion, along with relative rotation between the axle and the first motion component, the first convex portion and the second convex portion push against each other to drive the sliding member to move along the axle so as to compress the elastic member, and along with continuous relative rotation between the axle and the first motion component, the first convex portion surpasses the second convex portion to release elastic potential energy of the elastic member, so that the sliding member is returned by the elastic force of the elastic member along the axle and rotated relative to the second motion component.

20. The hinge module as recited in claim 13, wherein when the included angle between the first motion component and the second motion component is the first angle, the included angle between the first motion component and the third motion component is the first angle.

21. The hinge module as recited in claim 13, wherein when the included angle between the first motion component and the second motion component exceeds the second angle, the included angle between the first motion component and third motion component is the third angle.

22. The hinge module as recited in claim 13, wherein the second motion component has a stop portion, when the included angle between the first motion component and the second motion component is decreased to the first angle, the stop portion leans against the first motion component to stop the second motion component from continuing to rotate relative to the first motion component.

23. A hinge module, comprising:
a first motion component, a second motion component, and a third motion component, the second motion component being connected between the first motion component and the third motion component, wherein the second motion component has a slot, two ends of the slot forms a pushing portion and a pulling portion respectively;

a linking component, comprising a sliding member and an elastic member; and an axle, the first and second motion components being pivoted to the axle, the third motion component being fixed to the axle, the sliding member being slidably disposed on the axle, the elastic member being connected between the sliding member and the axle, and the axle has a column body thereon, the column body is located in the slot;

wherein when the second motion component rotates relative to the first motion component from a first operation state to a second operation state, the axle is rotated by the pushing portion of the second motion component pushing the column body of the axle and the third motion component and the sliding member are synchronously rotated relative to the first motion component by the axle, and the sliding member pushes against the first motion component to resist an elastic force of the elastic member and move along the axle, at the moment that the second motion component continues rotating relative to the first motion component from the second operation state, the sliding member is rotated relative to the second motion component by the elastic force of the elastic member, the axle is rotated by the sliding member, the column body of the axle departs from the pushing portion, the third motion member is rotated relative to the second motion component by the axle, when the second motion component continues rotating relative to the first motion component from the second operation state toward a first operation state, the axle is rotated by the pulling portion of the second motion component pulling the column body of the axle and the third motion component and the sliding member are synchronously rotated relative to the first motion component by the axle, and the sliding member pushes against the first motion component to resist an elastic force of the elastic member and move along the axle, at the moment that the second motion component continues rotating relative to the first motion component to reach the first operation state from the second operation state, the sliding member is rotated relative to the second motion component by the elastic force of the elastic member, the axle is rotated by the sliding member, and the third motion member is rotated relative to the second motion component by the axle.

24. The hinge module as recited in claim 23, wherein when the second motion component is in the first operation state, an included angle between the first motion component and the second motion component is a first angle, when the second motion component is in the second operation state, the included angle between the first motion component and the second motion component is a second angle, and when the second motion component is in the third operation state, the included angle between the first motion component and the second motion component is a third angle, the first angle is smaller than the second angle, and the second angle is smaller than the third angle.

25. The hinge module as recited in claim 23, wherein the sliding member is slidably disposed on the axle along an axial direction of the axle.

26. The hinge module as recited in claim 24, wherein when the included angle between the first motion component and the second motion component is increased from the first angle to the second angle, the pushing portion props against the column body, and when the included angle between the first motion component and the second motion component is decreased from the second angle to the first angle, the pulling portion props against the column body.

27. The hinge module as recited in claim 26, wherein an extending angle of the slot around the axle is equal to a difference between the second angle and the first angle.

28. The hinge module as recited in claim 26, wherein the first motion component has a position limiting slot, the position limiting slot is aligned with the slot and at least a part of the position limiting slot overlaps with the slot, ends of the position limiting slot are adapted to stop the column body, so as to limit a relative rotation range between the axle and the first motion component.

29. The hinge module as recited in claim 28, wherein an extending angle of the position limiting slot around the axle is equal to a difference between the third angle and the first angle.

30. The hinge module as recited in claim 23, wherein the sliding member has at least one first convex portion, the first motion component has at least one second convex portion, along with relative rotation between the axle and the first motion component, the first convex portion and the second convex portion push against each other to drive the sliding member to move along the axle so as to compress the elastic member, and along with continuous relative rotation between the axle and the first motion component, the first convex portion surpasses the second convex portion to release elastic potential energy of the elastic member, so that the sliding member is returned by the elastic force of the elastic member along the axle and rotated relative to the second motion component.

31. The hinge module as recited in claim 24, wherein when the included angle between the first motion component and the second motion component is the first angle, the included angle between the first motion component and the third motion component is the first angle.

32. The hinge module as recited in claim 24, wherein when the included angle between the first motion component and the second motion component exceeds the second angle, the included angle between the first motion component and third motion component is the third angle.

33. The hinge module as recited in claim 24, wherein the second motion component has a stop portion, when the included angle between the first motion component and the second motion component is increased to the third angle, one side of the stop portion leans against the first motion component to stop the second motion component from continuing to rotate relative to the first motion component, and when the included angle between the first motion component and the second motion component is decreased to the first angle, another side of the stop portion leans against the first motion component to stop the second motion component from continuing to rotate relative to the first motion component.

* * * * *